United States Patent [19]
Asrar et al.

[11] Patent Number: 5,973,100
[45] Date of Patent: Oct. 26, 1999

[54] NUCLEATING AGENTS FOR POLYHYDROXYALKANOATES AND OTHER THERMOPLASTIC POLYESTERS AND METHODS FOR THEIR PRODUCTION AND USE

[75] Inventors: Jawed Asrar, Chesterfield, Mo.; Jean R. Pierre, St-Denis, Belgium

[73] Assignee: Monsanto Company, St. Louis, Mich.

[21] Appl. No.: 09/122,440

[22] Filed: Jul. 24, 1998

Related U.S. Application Data

[60] Provisional application No. 60/053,719, Jul. 25, 1997.

[51] Int. Cl.$^6$ .................................................. C08G 63/00
[52] U.S. Cl. ........................................... 528/176; 528/193
[58] Field of Search ..................................... 528/176, 193

[56] References Cited

U.S. PATENT DOCUMENTS

| | | | |
|---|---|---|---|
| 4,536,531 | 8/1985 | Ogawa et al. | 524/135 |
| 4,830,779 | 5/1989 | Maeno et al. | 252/512 |
| 5,061,743 | 10/1991 | Herring et al. | 524/130 |
| 5,231,148 | 7/1993 | Kleinke et al. | 525/450 |
| 5,296,521 | 3/1994 | Gilmer et al. | 524/135 |
| 5,578,382 | 11/1996 | Waddington | 428/480 |

FOREIGN PATENT DOCUMENTS

| | | | |
|---|---|---|---|
| 0 058 293 | 8/1982 | European Pat. Off. | C08K 5/53 |
| 0 400 855 A1 | 12/1990 | European Pat. Off. | C08K 5/53 |
| 0 534 569 | 3/1993 | European Pat. Off. | C08L 67/02 |
| 0 633 287 A1 | 1/1995 | European Pat. Off. | C08K 5/5393 |
| 0 736 563 A1 | 10/1996 | European Pat. Off. | C08J 5/18 |
| 2048484 | 11/1995 | Russian Federation | C08G 63/183 |

OTHER PUBLICATIONS

Database WPI, Section Ch, Week 8227, Derwent Publications Ltd., London, GB; Class B03, AN 82–56603E (XP002083984) & SU 790 698 B (Urinovich, E.M.), Dec. 30, 1981; Abstract only.

International Search Report for PCT/US98/15400 filed Jul. 24, 1998.

*Primary Examiner*—Terressa Mosley
*Attorney, Agent, or Firm*—Gary Bond; Arnold, White & Durkee

[57] ABSTRACT

A nucleant system for polyhydroxyalkanoates and other thermoplastic polyesters comprises a class of organophosphorous compounds having at least two phosphonic acid moieties. The compounds can be used to effectively increase polymer crystallization rates and result in desirable properties in polymer-derived articles of manufacture, particularly when used in combination with effective nucleating agent solvents, organic metal salts, inorganic metal oxides, metal hydroxides or metal carbonates, and/or weak organic bases.

106 Claims, No Drawings

NUCLEATING AGENTS FOR POLYHYDROXYALKANOATES AND OTHER THERMOPLASTIC POLYESTERS AND METHODS FOR THEIR PRODUCTION AND USE

This application is based on U.S. Provisional Application Ser. No. 60/053,719, filed Jul. 25, 1997.

FIELD OF THE INVENTION

The invention relates to novel nucleating agents for polyhydroxyalkanoates (PHAs) and other thermoplastic polyesters and to the PHAs and other thermoplastic polyesters containing the nucleating agents and articles of manufacture made therefrom. Polyesters containing the nucleating agents have excellent clarity, moldability, dimensional stability and other physical characteristics appropriate for many applications.

BACKGROUND OF THE INVENTION

PHAs and other thermoplastic polyesters represent potential raw materials for a myriad of useful products which include melt-spun fibers from which non-woven products can be produced for medical gowns, masks etc., blown and cast films for compostable grocery and garbage bags, injection-molded bottles for health and personal care products, extrusion coatings on paper/paperboard for biodegradable/compostable fast-food containers and lawn and grocery sacks/bags etc. In the processes to produce such products, it is crucial to achieve line speeds, cycle times, and other processing parameters that are economically desirable. These parameters can be influenced to some extent by the use of nucleants, also referred to as nucleating agents, which promote crystallization of the molten or glassy resin resulting in a more rapid loss of tackiness and concurrent increase in mechanical strength. Thus, there is economic incentive to discover and develop efficient nucleating agents for PHAs and other thermoplastic polyesters.

PHAs are biopolymers synthesized inside the cell of many microorganisms as storage substances for energy and carbon and have the great advantage that they are compostable and biologically degradable (For review, see Anderson and Dawes, Micro. Rev. 54 (4): 450–472, 1990). PHAs are thermoplastic polyesters which can be processed into films, coatings, and shaped articles among other applications. Nevertheless, their processing frequently presents difficulties because of low rates of crystallization and poor clarity, limiting their use in many applications. In addition, PHA end-products are typically characterized by poor mechanical properties including a tendency to embrittlement with age after melt processing.

PHAs are being developed as a sustainable solution to address the issue of solid waste generated by the use of materials produced from fossil fuel. Some of the markets and applications most amenable to the use of PHAs include one-time-use disposables, packaging and biomedical applications.

The rate of crystallization of many PHAs is slow due to low nucleation density leading to long cycle times for thermal processing of PHAs into articles of manufacture. Production of shaped articles, films, coatings and other PHA-derived products therefore often requires the use of PHAs containing nucleating agents to increase the nucleation density and rate of crystallization, thereby allowing the polymers to be processed more economically. In addition, such agents can sometimes improve the physical and mechanical properties of the processed articles. Conventional nucleating agents include, for example, talc, micronized mica, calcium carbonate, boron nitride (EP-A-0291024), ammonium chloride (WO-A-9119759), and others.

U.S. Pat. No. 5,296,521 describes polyester compositions having increased crystallization rates comprising thermoplastic polyester resins (e.g. PET) and 0.5 to about 5 wt % of nucleating agent of the formula $RO[P(O)(Ph)(CH_2)mO]nH$ where R is an alkali or alkaline earth metal; m is 1, 2, or 3; n takes an average value within the range of 1 to 5. The nucleating agent can be optionally mixed with the acid or ester form (R=H or alkyl) providing at least 50 mole % of the nucleating agent is in the salt form. The nucleating agent is preferably in the form of the sodium salt (e.g. sodium salt of hydroxymethylphenyl phosphinic acid or sodium salt of oligomethylene phenyl phosphinic acid).

U.S. Pat. No. 4,536,531 describes use of carboxylic salts of metals of Group I and II in the Periodic Table as nucleating agents for polyesters exemplified by metal salts of aliphatic monocarboxylic acids such as acetic acid, propionic acid, caproic acid, palmitic acid, stearic acid, oleic acid, behenic acid, montanic acid etc. Suitable metals are sodium, potassium, lithium, magnesium, calcium, barium, and zinc. In these carboxylic acid salts, it is unnecessary that all the carboxyl groups be converted into salt form, but a part of the carboxyl groups may be in a salt form and the remaining groups may be in a free acid or ester form.

JP 48074550 describes use of metal salts of aryl phosphonates as nucleating agents for polyesters (e.g. PBT). Use of 0.5 wt % zinc phenylphosphonate in PBT gave a faster molding time and improved properties compared with PBT alone. Calcium benzylphosphonate and aluminum phenylphosphonate gave similar results.

U.S. Pat. No. 5,061,743 discloses a preferred PHA nucleant made by dry blending cyclohexylphosphonic acid (DZB) and zinc stearate with polyhydroxy-butyrate-co-valerate (PHBV). The nucleant is disclosed as particularly advantageous for the nucleation of PHBV having high HV content.

RU 2048484 describes the use of 1-hydroxyethylidene-1,1-diphosphonic acid (HEDP) in a solution of technical grade methyl phosphate to reduce the concentration of carboxyl groups and increase the thermal stability of polyethylene terepthalate (PET).

Although many of these compounds have shown effectiveness in increasing the nucleation density of PHA, and therefore crystallization rates, certain disadvantages have been associated with their use. Dispersion of particulate nucleants, for example, has been problematic because agglomeration frequently occurs during processing which can generate regions of stress concentration and inhomogeneity in molding. In addition, nucleants such as boron nitride have been found to act as pigments in some situations, particularly in films and injection moldings, giving rise to opaque products where transparent products are generally desired. Furthermore, some nucleant systems include constituents which may be undesirable from an environmental and toxicological standpoint. Thus, there is a need for benign and cost-effective nucleant systems which allow for the production of PHA resins having high crystallinity and excellent moldability, mechanical strength, and dimensional stability.

SUMMARY OF THE INVENTION

The present invention provides nucleants, PHA and other thermoplastic polyester compositions containing such nucleants, and articles of manufacture produced therefrom. The invention broadly comprises a novel nucleating system which is benign, cost-effective, and which provides a means for effectively nucleating thermoplastic polyesters and thereby increasing their crystallization rates. The invention is applicable to any situation in which accelerated crystallization rates are desired. In particular, the nucleants are useful for improved production of PHA and other thermoplastic polyester products by decreasing the cycle times normally required for producing molded articles, films, coatings, etc.

It has now been found that organophosphorous compounds having at least two phosphonic acid moieties, hereinafter referred to as ODPAs, can be used as nucleants for PHAs and other thermoplastic polyesters, and that polyesters containing such nucleants exhibit an advantageous rate of crystallization and can have excellent clarity and other highly desirable mechanical and physical properties.

In one aspect, the invention comprises a mixture of at least one ODPA with at least one effective nucleating agent solvent for dissolving the ODPA, and producing particulate nucleant for PHAs and other thermoplastic polyesters upon evaporation of said solvent.

In other aspects, the mixture of the ODPA and the effective nucleating agent solvent further optionally comprise one or more compounds which served to enhance the desirability of the ODPAs as nucleants. These include organic metal salts such as fatty acid metal salts, inorganic compounds such as metal oxides, metal hydroxides and metal carbonates, and/or weak organic bases such as fatty acid amides. Such compounds provide additional benefits to polyesters containing the nucleants, for example improved color, clarity, elongational and/or tensile properties.

In further aspects, the invention comprises PHA and other thermoplastic polyester compositions containing the described nucleants and methods of making such compositions. PHAs and other thermoplastic polyesters combined with the nucleants of the invention can, for example, be melt processed into pellets suitable for use in producing a variety of polymeric articles of manufacture where improved nucleation is desired.

DETAILED DESCRIPTION OF THE INVENTION

The nucleants of this invention are suitable for use with thermoplastic polyesters produced by known synthetic or biological processes. Some of the thermoplastic polyesters suitable for use with the nucleants of this invention can include, for example, polyhydroxyalkanoate (PHA), polyethylene terephthalate, polybutylene terephthalate (PBT), various copolyesters of PET and PBT with aliphatic diacids, diols, or hydroxy acids to render the copolyesters biodegradable or compostable, and various aliphatic polyesters and copolyesters derived from dibasic acids such as succinic acid, glutaric acid, adipic acid, sebacic acid, azelaic acid, or their derivatives such as alkyl esters, acid chlorides, or their anhydrides; diols such as ethylene glycol, propylene glycol, 1,4-butanediol, 1,6-hexanediol, 1,4-cyclohexanedimethanol etc., or their cyclic oxides such as ethylene oxide, propylene oxide, THF etc.; lactic acid or lactide, or glycolic acid or glycolide. In addition, various coupling agents such as diisocyanates, diacid anhydrides, tetracarboxylic acids etc. can be used to increase the molecular weight of the polyester/copolyester.

The nucleants of the invention are particularly well suited for use with PHAs. PHAs are biodegradable polymers or copolymers having the following general structure for one or more of the repeating units:

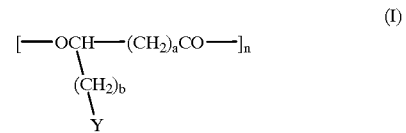

(I)

where a is 0 to 6, b is 0 to 15, Y is H, F, Cl, Br, CN, OH, $CO_2H$, $CO_2R$ (where R is alkyl, benzyl etc.), methyl, cyclohexyl, phenyl, p-nitrophenoxy, p-cyanophenoxy, phenoxy, acetoxy, vinyl, 2-propyl, 2-butyl, 2-pentyl, 2-hexyl, etc., and n is an integer. The pendant groups of the repeating units may contain additional functionalization such as double bonds, epoxidized double bonds, hydroxyl groups, alkyl groups, alkenyl groups etc. or combinations thereof. The polymer main chain can contain up to 8 carbons in the repeating units and there may be additional functionalization in or on the main chain such as double bonds, alkyl groups, alkenyl groups, hydroxyl groups etc. or combinations thereof.

The PHA is preferably one capable of being biologically produced, for example in a plant or microbial organism. Most typically, it is a fermentation product, particularly of a microbiological process, whereby a microorganism lays down polyhydroxyalkanoate during normal or manipulated growth. Manipulation may be achieved by removing or failing to produce one or more nutrients necessary for cell multiplication. Numerous microbiological species are known in the art to be suitable for the production of polyhydroxyalkanoate polymers (see for example, Anderson and Dawes, Micro. Rev. 54 (4): 450–472, 1990). The microorganisms may be wild type or mutated or may have the necessary genetic material introduced into it, for example by any of the methods or recombinant DNA technology. It is to be emphasized that it is not necessary for the PHA-producing organism to be a microorganism, but at present such organisms are preferred.

The PHAs preferably have as constituents hydroxyalkanoates (HA) monomers which are substrates for PHA synthase enzymes. Biologically-produced PHA polymers are the product of PHA synthase microbial enzymes, and are produced in either a bacterial cell which naturally contains a PHA synthase, or in a bacterial or other cell type, for example a plant cell, which has been genetically engineered to express such an enzyme. The microbial PHA synthase enzymes have broad substrate ranges and are capable of incorporating a large number of HA monomers as constituents of biosynthetic PHA depending upon growth conditions, precursor substrate availability, and the source of the PHA synthase enzyme. The diversity in composition of biosynthetic PHA polymers is underscored by the fact that at least 91 HA monomers have been identified as substrates for PHA synthases (Steinbuchel, A. and Valentin, H. FEMS Micro.Letters 128 (1995) 219–228).

Suitable HA monomers can include those having the following formula:

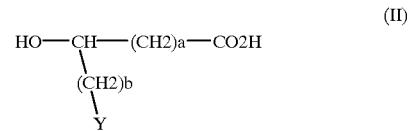

(II)

where a is 0 to 6, b is 0 to 15 and Y is H, F, Cl, Br, CN, OH, $CO_2H$, $CO_2R$ (where R is alkyl, benzyl etc.), methyl, cyclohexyl, phenyl, p-nitrophenoxy, p-cyanophenoxy, phenoxy, acetoxy, vinyl, 2-propyl, 2-butyl, 2-pentyl, 2-hexyl, etc. As in the above description, there may be additional functionalization in or on the pendant and/or main chains. The monomers can be homopolymerized or copolymerized either biochemically or synthetically to produce the polymer.

Preferred HA monomers include those where a=1–4, b=0–15, and Y is H. More preferably, the monomers are those where a=1–2 and b=0–3, and Y is H.

In a most preferred polymer, the PHA is of formula (I) where a is 1, b is 1 or 2 and Y is H and especially where there are units with b=1 and b=2 copolymerized together. Suitable polyesters contain a preponderance of b=1, especially with at least 70 mol % of such units, the balance being units in which b=2. Polymer containing a=1, b=1, Y=H as the only units is polyhydroxybutyrate (PHB) polyester while that containing additionally b=2 is polyhydroxybutyrate-co-valerate (PHBV).

The polymer can also be a blend of two or more PHAs differing in the value of m. A particular example contains:
 a) polymer consisting essentially of Formula I units in which 2–5 mol % of units have a=1, b=2 and Y=H, the rest a=1, b=1, and Y=H, and
 b) polymer consisting essentially of Formula I units in which 5–30 mol % of units have a=1,b=2 and Y=H, the rest a=1,b=1,and Y=H.

The proportions of the polymer in such a blend is preferably such as to give an average a=1, b=2 and Y=H content in the range 2 to 28 mol % and typically 4 to 18 mol %. Thus, in a most preferred form the polymer is a poly (hydroxybutyrate/valerate) copolymer or blend of copolymers.

In one embodiment of the present invention, it has been found that compounds of formula III:

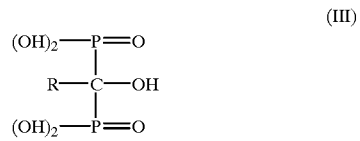

where R can be hydroxy, hydrogen, $C_1$–$C_{25}$ alkyl groups (with or without one or more substituent groups such as —OH, —$CO_2$H, —Cl, —Br, —$NH_2$, —N(alkyl)H or N(alkyl)$_2$), cycloalkyl groups, aryl or arylalkyl groups (such as phenyl, benzyl, etc. with or without substituents on the aromatic rings), can be used as nucleants for PHAs. Synthesis of such compounds can be achieved, for example, by reaction of organocarboxylic acids and $PCl_3$ in an aqueous medium. The compounds and their syntheses have been described for use as water treating chemicals, detergent ingredients, etc. (for example see U.S. Pat. No. 3,855,284, U.S. Pat. No. 3,400,147, U.S. Pat. No. 3,400,150, U.S. Pat. No. 4,254,063, Aus. 599,950, FR 1,521,961 and CA 93:182031). The synthesis can also be applied to dibasic acids such as adipic acid, succinic acid, etc. to give the corresponding tetrakis phosphonic acids (i.e., di-ODPAs) which can also be used as nucleants according to the present invention. For example, with adipic acid, 1,6-dihydroxy-1, 6-dihexanediylidene tetraphosphonic acid is obtained (Aus. 599950). Other compounds that can be used as nucleants include methylene diphosphonic acid (PL 131549) and carbonyl diphosphonic acid (CA 93:182031). Such compounds are herein sometimes referred to as organodiphosphonic acids or ODPAs, which is term intended to include both ODPAs and di-ODPAs. The ODPAs or di-ODPAs may also be formed in situ, for example by reaction of the corresponding phosphinic acids.

ODPAs particularly preferred for use as nucleants according to this invention include 1-hydroxy-lower alkylidene-1, 1-diphosphonic acids such as 1-hydroxyethylidene-1,1-diphosphonic acid (HEDP), 1-hydroxypropylidene-1,1-diphosphonic acid, 1-hydroxybutylidene-1,1-phosphonic acid, 1-hydroxycyclohexylidene-1,1-diphosphonic acid. In a particularly preferred compound, both acid moieties are phosphonic acid moieties, R1 is a methyl group and R2 is hydroxy group (i.e., HEDP). HEDP is available as a mixture of HEDP in water from Monsanto Company (800 N. Lindbergh, St. Louis, Mo. 63167) under the tradename DEQUEST 2010. The ODPA is used in amounts typically in the range of 0.01 to 5 phr (parts per hundred resin), preferably about 0.02 to 1.0 phr, most preferably 0.02 to 0.5 phr.

The nucleants can further be metallic salts of ODPAs, preferably mono-metallic salts. However, it is generally preferred that not all, e.g., less than 70%, more preferably less than 60% of the phosphonic acid moieties are involved in the salt formation since it has been found that excessive salt formation may under some conditions adversely influence the effectiveness of certain nucleants of the invention.

According to another aspect of the invention, it has been found advantageous to dissolve the ODPA nucleants of the invention in an effective nucleating agent solvent. The term "nucleating agent solvent" herein means a solvent which dissolves the ODPA and which does not intolerably reduce its effectiveness as a nucleant and preferably enhances its nucleation activity. Thus, the ODPA prepared using an effective nucleating agent solvent as described herein will have at least as effective nucleation activity, preferably greater nucleation activity, compared to the same ODPA that is not dissolved in an effective nucleating agent solvent during its preparation or use.

Nucleating agent solvents for use in this invention include but are not limited to $C_1$ to $C_6$ aliphatic mono, di- and triols such as methanol, ethanol, ethylene glycol, 1- or 2-propanol, propylene glycol, glycerol, 2-methyl-2-propanol, 2-butanol and the like, and further including mixtures of such solvents with each other and with water. Preferred nucleating agent solvents include methanol, ethanol or another lower alcohols, or mixtures of such alcohols with water to allow for easy solvent removal. The nucleating agent solvent needs to be appropriately selected since it has been found that some solvents such as acetone and tetrahydrofuran when used with some ODPAs such as HEDP are not effective nucleating agent solvents. However, it is known that mixtures of solvents, e.g. methanol and acetone, can serve as effective nucleating agent solvents as defined herein even though one of the solvents in the mixture is not an effective nucleating agent solvent when used alone. While all of the solvents which will be effective nucleating agent solvents have not yet been elucidated, a person skilled in the art can readily determine whether a proposed solvent for an ODPA is "effective" by routine experimentation following the description herein.

According to a further aspect, the invention comprises a mixture of an ODPA, an effective nucleating agent solvent, and optionally an organic metal salt, an inorganic metal oxide, metal hydroxide or metal carbonate, and/or a weak organic base.

Organic metal salts and/or certain inorganic compounds can be used to further improve nucleation activity and/or reduce the extent of discoloration and/or improve the clarity of PHA-derived products when used in combination with the ODPAs of the invention. The organic metal salt is preferably an organic acid metal salt, more preferably a fatty acid metal salt. The inorganic compound is preferably an metal oxide, a metal hydroxide or a metal carbonate. Suitable metals include those selected from Groups I to V of the periodic table, preferably aluminum, antimony, tin, sodium, calcium, magnesium, barium or zinc. Most preferably the metal is one which has benign environmental and toxicological properties such as magnesium, calcium and barium. Preferred fatty acids include stearic acid, palmitic acid, acetic acid, propionic acid, caproic acid, oleic acid, behenic acid and montanic acid. Most preferably, the fatty acid metal salt of the invention is calcium stearate or magnesium stearate which have proven highly effective in combination with ODPAs in nucleating thermoplastic polyesters.

The organic metal salt or the inorganic metal oxide, metal hydroxide or metal carbonate is used in an amount typically ranging from 0.001 to 5 phr (parts per hundred of resin), preferably about 0.005 to 2 phr, and most preferably about 0.01 to 0.5 phr.

A nucleant formulation of this aspect of the invention preferably comprises organic metal salt (or inorganic metal oxide, metal hydroxide or metal carbonate) and ODPA in weight ratios of about 0.01:1 to 10:1, preferably about 0.05:1 to 7.5:1, and more preferably about 0.1:1 to 5:1. When calcium stearate is used in a preferred nucleant formulation, a 3:1 ratio has been found to provide a suitable solid support for the ODPA-solvent solution and to produce a PHA nucleant with desirable activity.

The weak organic base is one which is effective in improving the elongational properties and/or clarity of the polymeric material. The weak organic base should be polymer-miscible or -soluble and melt at a sufficiently high temperature so that, if desired, nucleating agent solvent can be readily removed during preparation. The weak organic base preferably comprises a mono-, bis-, or tri-fatty acid amide, as these generally exhibit good hydrolytic stability in the presence of ODPAs. More preferably, the weak organic base is a stearamide, for example ethylene bistearamide (EBS), available from Lonza or Henkel under the tradename Acrawax C or Loxamid EBS. The weak organic base is typically present in the polymeric compositions in an amount between about 0.01 to 9.0 phr, preferably between about 0.05 to 1.0 phr, most preferably about 0.1 to 0.5 phr.

In a most preferred embodiment, a nucleant formulation of this invention comprises HEDP/calcium stearate/EBS present in ratios effective for nucleating PHA and producing PHA articles having improved clarity, color, elongational and tensile properties. These constituents in a most preferred formulation are present in weight ratios of about 0.8/1.5/1.7 respectively, however other ratios are suitable as well provided the resulting nucleant retains at least one of the beneficial properties referred to above. Suitable ratios can be readily determined by one skilled in this art.

The nucleant formulation is combined with PHA or another thermoplastic polyester in an amount effective for increasing the crystallization rate of the polymer, for example as reflected by an increased temperature of crystallization (Tc) by differential scanning calorimetry (DSC). Suitable levels of the nucleant formulation to be added to the PHA or other thermoplastic polyester range from about 0.01 to 5.0 parts per hundred of resin (phr). Preferably, the level of the nucleant formulation is about 0.05–1.0 phr, and most preferably it is about 0.1–0.6 phr.

In another aspect of this invention, there are provided methods of preparing the PHA nucleants of the invention. In a first embodiment of this aspect, an ODPA is combined with one or more effective nucleating agent solvents and optionally one or more organic metal salts (or inorganic metal oxides, metal hydroxides or metal carbonates) and/or weak organic bases. Thereafter, the solvents can be removed if desired, for example by evaporation. The resulting solids, after grinding or some other procedure to ensure appropriate particle size, comprise the particulate nucleants of this invention.

Alternatively, in a second embodiment of this aspect, the suspension/mixture comprising the ODPA, the nucleating agent solvent, and optionally the organic metal salt (or inorganic metal oxide, metal hydroxide or metal carbonate) and/or the weak organic base, is itself added to the PHAs and used as the nucleating agent without removing the nucleating agent solvent. In this situation, the solvent would typically be eliminated by evaporation during polymer melt processing. If, however, the boiling point of the solvent is greater than the temperature at which PHA is melt processed, some or all the solvent may remain in the processed article. It will be apparent to those skilled in the art that in this situation, nucleating agent solvents whose presence would be undesirable in a PRA-derived product are not preferred.

Alternatively, in a third embodiment of this aspect, the ODPA, the organic metal salt or inorganic metal oxide, metal hydroxide or metal carbonate, and/or the weak organic base are dry blended, and the blend is then combined with a thermoplastic polyester prior to or during melting. In another approach, the dry blend is melted, solidified and ground to produce the nucleant formulation which can then be added to the thermoplastic polyester.

A preferred nucleant formulation is made by the first aspect of this embodiment. In this approach, the organic metal salt (or the inorganic metal oxide, metal hydroxide or metal carbonate) is dispersed with the ODPA in solvent which comprises one or more nucleating agent solvents or a mixture of one or more nucleating agent solvents and water. Preferably, a weak organic base such as EBS is further dispersed with the ODPA/organic metal salt/solvent mixture. The ODPA/organic metal salt/weak organic base constituents are most preferably added in weight ratios of about 0.8/1.5/1.7, respectively, however numerous other ratios are expected also to be effective and can be readily determined by the skilled individual. Following dispersion of the constituents, the solvent is removed, for example by evaporation under vacuum, and the vacuum is maintained in order to dry the resulting solids.

In producing particulate nucleant having the desired particle sizes, the solids recovered following solvent removal can, for example, be ground, pulverized, etc. in any manner known to those skilled in the art, and appropriately sized particles recovered, for example, by sieving. Alternatively, one could employ an approach during the solvent removal process, possibly sonication and/or high shear, which would result in the recovered solids already having the desired diameters without the need for grinding.

The particles are preferably less than about 710 microns in diameter. Particles above this size have been found ineffective as PHA nucleating agents (Example 9). Most preferably, the particle size is less than about 350 microns as dispersion of particulate nucleant with polymeric powders is favored by small particle size. In addition, smaller particle sizes can effectively increase the number of nucleation sites.

Thus, in a further aspect, the invention comprises nucleant particles comprising ODPA and optionally an organic metal salt or an inorganic metal oxide, metal hydroxide or metal carbonate, and/or a weak organic base, wherein the size of the particles is appropriate for increasing the nucleation of a thermoplastic polyester. Preferably, the particles are less than 710 microns in diameter, more preferably below 350 microns.

The invention further provides PHA and other thermoplastic polyester compositions containing the nucleants of the present invention as described in the above embodiments. The polymeric material is combined with the nucleants in any of a number of ways known to the skilled individual. Preferably, the polymer and nucleant are combined and melt extruded into strands which are crystallized and cut into pellets. The pellets so produced provide an advantageous form for use in processes where improved nucleation is desired, namely for production of polymeric films, coatings and shaped articles.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute examples of preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Use of HEDP as Nucleating Agent for PHAs

Powder blends of polyhydroxy-butyrate-co-valerate (PHBV; 8% HV) with either 0.2 or 0.5 phr HEDP were prepared by suspending the PHBV powder in a methanol solution of HEDP and evaporating the methanol in a rotavapor. Powder blends of polycaprolactone (PCL) with either 0.1 or 0.2 phr HEDP in were prepared in the same manner.

Differential scanning calorimetry (DSC) was used to analyze the powder blends and neat PHBV and PCL. DSC experiments were carried out on hot pressed films obtained by melting the powder blends at 180° C. DSC is an analytical technique which allows for precise determinations of enthalpy changes during an endothermal or exothermal event. In this regard, it is a valuable tool for studying the melting and crystallization characteristics of crystalline materials. If molten polymer is cooled at a constant rate, an exotherm may be produced as the polymer crystallizes. The temperature range over which the crystallization occurs, the area of the peak and the peak sharpness provide information about the crystallization behavior. The addition of a nucleating agent generally causes an increase in the crystallization peak temperature and the peak area.

As the following data demonstrate, an ODPA can finction as an effective nucleant for PHAs as indicated by the increased Tc (crystallization temperature) and/or DHc (heat of crystallization) values.

| Formulation | Tc (C.) | DHc (J/g) | Tm (C.) |
| --- | --- | --- | --- |
| PHBV (alone) | 56 | −15 | — |
| PHBV/0.2 HEDP | 78 | −55 | 157 |
| PHBV/0.5 HEDP | 77 | −55 | 152 |
| PCL (alone) | 4 | −60 | — |
| PCL/0.1 HEDP | 20 | −60 | — |
| PCL/0.2 HEDP | 22 | −60 | — |

EXAMPLE 2

Preparation of Particulate Nucleant Formulation

About 30 g. calcium stearate was added to about 100 ml methanol sufficient to cover the calcium stearate powder. After stirring the suspension for about one minute, 18 g. of DEQUEST 2010 (comprising about 60% HEDP in solution in water) were added. The solvent (MeOH/water) was then evaporated under vacuum in a rotavapor held at about 50 deg.C. After complete evaporation, the HEDP-calcium stearate solids were dried under vacuum in an oven held at 50 deg.C. The nucleant solid obtained was composed of approximately 25% HEDP and 75% calcium stearate. The DSC of the HEDP-calcium stearate solid showed a broad melting peak starting around 50 deg.C.

The HEDP-calcium stearate solid was ground using a simple coffee grinder and the resulting particle size distribution determined by sieving. The weight % of nucleant passing through the different sized sieves is shown in the Table below. The average particle size of the ground nucleant was determined to be about 350 microns.

| Sieve Size (microns) | Pass Weight % |
| --- | --- |
| 710 | 78 |
| 500 | 64 |
| 355 | 49 |
| 250 | 32 |
| 180 | 20 |

EXAMPLE 3

Preparation of PHA Pellets Containing the Nucleant Formulation

A formulation based on 100 phr PHBV (8% HV) powder and 0.4 phr of the ground powder from Example 2 was dry-blended in a Pappenmeier high speed mixer. 10 phr ATC (acetyltributylcitrate) plasticizer was then added to the dry blend while the Pappenmeier was in rotation. The powder blend was transferred in a vibrating hopper feeding a 25 mm Betol single screw extruder (polyethylene screw; L/D=20) fitted with a 4 mm diameter single strand circular die using a barrel temperature profile of 140–170 deg.C. and a screw speed of 40 rpm. The extruded strand was crystallized in a 5 meter long water bath held at 55–60 deg.C. using a thermoregulator and then cut into cylindrical pellets of 2–4 mm diameters and 3–6 cm lengths in a pelletizer.

EXAMPLE 4

Crystallization Behavior of PHA Containing Nucleant Formulations

A blend of PHBV (8% HV) and particulate nucleant comprising 0.1 phr HEDP/0.3 phr calcium stearate was prepared using the techniques described in Example 1 and 2. A blend of PHBV (8% HV) and 0.1 phr DZB/0.4 zinc stearate was also prepared. The films obtained by hot pressing the blended powders and the neat PHBV were analyzed by DSC. The color of the PHBV containing 0.1 HEDP/0.3 calcium stearate was comparable to that of PHBV containing 0.1 DZB/0.4 zinc stearate and better than that of PHBV containing HEDP only (as in Example 1). The following results were obtained:

| Formulation | Tc (deg. C.) | DHc (J/g) | Tm (deg. C.) |
|---|---|---|---|
| PHBV (alone) | 56 | −15 | — |
| PHBV/0.1 HBDP/ 0.3 calcium stearate | 72 | −51 | 147–155 |
| PHBV/0.1 HBDP/ 0.3 magnesium stearate | 72 | −50 | — |
| PHBV/0.1 DZB/ 0.4 zinc stearate | 75 | −55 | 157 |

Thus, by combining an ODPA with an organic salt such as calcium stearate or magnesium stearate, nucleation activity may be maintained or improved while the extent of discoloration of PHA products is reduced.

EXAMPLE 5–8

Effect of Nucleating Agent Solvent

EXAMPLE 5

Calcium stearate dry blended with HEDP powder in a 3:1 ratio shows only a broad melting zone by DSC from 90 to 130 deg.C. corresponding to the melting of calcium stearate. Once the dry blend of HEDP/calcium stearate is molten, a second DSC heating curve shows a complex melting peak from 50 to 80 deg.C. indicating that HEDP and calcium stearate reacted in the melt.

A nucleant prepared by grinding the product formed from the melt was blended at 0.4 phr with PHBV (8% HV) in a mortar. A film obtained by hot pressing the blend had a Tcr of 47 deg.C. and a DHcr of −6 J/g vs 72 C and −51 J/g for nucleant prepared from methanol solution as in Example 4. A second crystallization peak during the second heat DSC run was observed for the nucleant prepared from HEDP/ calcium stearate molten species, suggesting a low nucleation efficiency for nucleant prepared in the absence of methanol.

Thus, a nucleating effect can be achieved with nucleants prepared in the absence of nucleating agent solvents. However, the most effective nucleating effect is observed when the nucleants of the invention are prepared using an effective nucleating agent solvent.

EXAMPLE 6

The procedure of Example 2 was repeated with the exception that ethanol was used in place of methanol as the nucleating agent solvent. The dried HEDP-calcium stearate powder showed a broad melting point peak in the DSC beginning at 50 deg.C. A blend of 0.4 phr of the HEDP-calcium stearate powder with PHBV (8% HV) and 10 phr ATC showed a Tcr and DHcr of 68 deg.C. and −47 J/g. which is essentially the same as the powder produced from methanol.

EXAMPLE 7

The procedure of Example 6 was repeated with the exception that acetone was used in place of methanol as the nucleating agent solvent. The dried HEDP/calcium stearate powder showed a broad melting point peak in the DSC beginning at 50 deg.C. A film obtained from a blend of 0.4 phr of the HEDP-calcium stearate powder with PHBV (8% HV) showed a Tcr and DHcr of 49 deg.C. and −2 J/g.

Thus, the nucleant produced using acetone as the nucleating agent solvent did not have the same effectiveness as a nucleant produced using methanol or ethanol as the nucleating agent solvent.

EXAMPLE 8

The procedure of Example 6 was repeated with the exception that tetrahydrofuran was used in place of methanol as the nucleating agent solvent. The dried HEDP/ calcium stearate powder showed a broad melting point peak in the DSC beginning at 50 deg.C. A film obtained from a blend of 0.4 phr of the HEDP/calcium stearate powder with PHBV (8% HV) showed a Tcr and DHcr of 53 deg.C. and −7 J/g.

Thus, the nucleant produced using tetrahydrofuran as the nucleating agent solvent did not have the same effectiveness as a nucleant produced using methanol or ethanol as the nucleating agent solvent.

EXAMPLE 9

Effect of Particle Size on Nucleation Efficiency

Effect of the particle size of HEDP/calcium stearate nucleant powder on the nucleation efficiency was evaluated. Fractions obtained by sieving the coarse powder which had been ground in a mortar, were used to nucleate PHBV (8%HV) (0.4 phr HEDP/calcium stearate and 10 phr ATC plasticizer. The experiments were carried out on 2 g powder which was first thoroughly mixed with a spatula but not ground, so as to maintain the granulometry of the nucleant. After addition of 10 phr acetyltributylcitrate (ATC) plasticizer and further blending with a spatula, the homogeneous "dry blend" was placed on a microscope glass plate and melted using a hot plate at 180 deg.C. A thin film was "rolled" using a Pasteur pipette. After cooling, about 10 mg of the film was analyzed by DSC to evaluate the nucleation efficiency. The table below gives DSC results for films made from different fractions of the powder. Shown also is the % of each particular fraction in the coarse powder blend made in the laboratory. A reference made using the coarse powder as ground in the mortar without sieving is also shown in the table.

| Fraction | % | Tcr (deg. C.) | DHcr (J/g) |
|---|---|---|---|
| Reference | | 68 | −41 |
| Less than 180 microns: | 20 | 64 | −42 |
| 180 to 250 microns: | 12 | 64 | −42 |
| 250 to 355 microns: | 17 | 57 (broad peak) | −31 |
| 355 to 500 microns: | 15 | 50 (broad peak) | −14 |
| 500 to 710 microns: | 14 | 50 (broad peak) | −10 |
| More than 710 microns: | 22 | No nucleation peak | |

Thus, the particle size should be less than about 710 microns for optimum nucleating activity with PHAs since no effect was observed for larger particles. In addition, at particle sizes less than about 350 microns, the activity of the nucleant further increased.

EXAMPLE 10

Modification of Nucleant System for Improved Elongation

It has been found that some of the calcium stearate can be replaced with a fatty acid amide, such as EBS (Acrawax C), in order to improve elongation-at-break of finished goods. A formulation of PHBV (8% HV) and 0.08 phr HEDP, 0.15 phr calcium stearate and 0.17 phr EBS was found to have enough calcium stearate to prevent significant discoloration (color equivalent to BN) but not so much as to decrease the product toughness. Plasticized PHBV formulations based on BN, HEDP/calcium stearate and HEDP/calcium stearate/ EBS were prepared as described in Examples 2 and 3 and molded into tensile bars. The clarity of the material containing HEDP/calcium stearate/EBS was good while the material containing BN was opaque.

|  | PHBV(8% HV) 1 phr BN 10 phr ATC | PHBV(8% HV) 0.1 phr HEDP 0.3 phr CaSt 10 phr ATC | PHBV(8% HV) 0.08 phr HEDP 0.15 phr CaSt 0.17 phr EBS 10 phr ATC |
|---|---|---|---|
| DSC Results |  |  |  |
| Tcr, deg. C. | 90 | 72 | 74 |
| DHcr, J/g | −40 | −42 | −45 |
| Tensile Data |  |  |  |
| Strength, Mpa |  |  |  |
| as molded | 22 | 20 | 22 |
| Elong. at Break (%) |  |  |  |
| as molded | 26 | 12 | 22 |

Thus, nucleant formulations further containing a weak organic base, EBS in this example, resulted in high crystallization rates and clarity as was provided by the ODPA/ organic metal salt nucleant formulations, but exhibited improved elongational properties.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied without departing from the concept, spirit and scope of the invention. More specifically, it will be apparent that certain agents which are chemically or functionally related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A composition useful for nucleating thermoplastic polyesters, comprising:
    an organophosphorous compound having at least two phosphonic acid moieties; and
    at least one compound selected from organic metal salts, inorganic metal oxides, metal hydroxides, or metal carbonates.
2. The composition of claim 1 wherein the organophosphorous compound is selected from compounds having the formula:

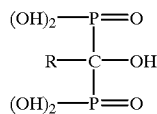

where R is hydroxy, hydrogen, or C1–C25 alkyl groups optionally having one or more substituent groups selected from —OH, —CO2H, —Cl, —Br, —NH2, —N(alkyl)H or N(alkyl)2, cycloalkyl, aryl or arylalkyl groups.

3. The composition of claim 1 wherein the organophosphorous compound is 1-hydroxyethylidene-1,1-diphosphonic acid, 1-hydroxypropylidene-1,1-diphosphonic acid, 1-hydroxybutylidene-1,1-phosphonic acid, or 1-hydroxycyclohexylidene-1,1-diphosphonic acid.
4. The composition of claim 1 wherein the organic metal salt comprises a fatty acid salt of a metal compound from groups I to V of the periodic table.
5. The composition of claim 4 wherein the metal is aluminum, antimony, tin, sodium, calcium, magnesium, barium or zinc.
6. The composition of claim 4 wherein the fatty acid is stearic acid, palmitic acid, acetic acid, propionic acid, caproic acid, oleic acid, behenic acid or montanic acid.
7. The composition of claim 1 wherein the organic metal salt is calcium stearate, barium stearate or magnesium stearate.
8. The composition of claim 1 wherein the organophosphorous compound is 1-hydroxyethylidene-1,1-diphosphonic acid and the organic salt is calcium stearate.
9. The composition of claim 1 wherein the organophosphorous compound is in the form of particles, wherein the particles have diameters in the range of 710 microns or less.
10. The composition of claim 1 wherein the organophosphorous compound particles have diameters in the range of about 350 microns or less.
11. The composition of claim 1 further comprising a weak organic base.
12. The composition of claim 11 wherein the weak organic base comprises a fatty acid amide.
13. The composition of claim 11 wherein the weak organic base is ethylene bistearamide.
14. The composition of claim 1 wherein the polyester is an aliphatic polyester.
15. The composition of claim 1, wherein the thermoplastic polyester is a polyhydroxyalkanoate.
16. The composition of claim 15, wherein the polyhydroxyalkanoate has the formula:

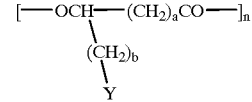

where a 1–6, b=0–15, and Y is H, and n is an integer.

17. The composition of claim 16 wherein a is 1, b is 1 or 2, Y is H, and n is an integer.
18. A composition of matter, comprising:
    (a) an organophosphorous compound having at least two phosphonic acid moieties; and
    (b) a nucleating agent solvent.
19. The composition of claim 18 wherein the organophosphorous compound is selected from compounds having the formula:

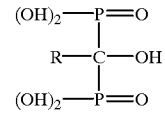

where R is hydroxy, hydrogen, or C1–C25 alkyl groups optionally having one or more substituent groups selected from —OH, —CO2H, —Cl, —Br, —NH2, —N(alkyl)H or N(alkyl)2, cycloalkyl, aryl or arylalkyl groups.

20. The composition of claim 18 wherein the organophosphorous compound is 1-hydroxyethylidene-1,1-diphosphonic acid, 1-hydroxypropylidene-1,1-diphosphonic acid, 1-hydroxybutylidene-1,1-phosphonic acid, or 1-hydroxycyclohexylidene-1,1-diphosphonic acid.

21. The composition of claim 18 wherein the nucleating agent solvent is an aliphatic alcohol.

22. The composition of claim 18 wherein the nucleating agent solvent is methanol, ethanol, 1-propanol, or 2-propanol.

23. The composition of claim 18 further comprising at least one compound selected from organic metal salts inorganic metal oxides, metal hydroxides, or metal carbonates.

24. The composition of claim 23 wherein the organic metal salt comprises a fatty acid salt of a metal from Group I to V of the Periodic Table.

25. The composition of claim 24 wherein the metal is aluminum, antimony, tin, sodium, calcium, magnesium, barium or zinc.

26. The composition of claim 24 wherein the fatty acid is stearic acid, palmitic acid, acetic acid, propionic acid, caproic acid, oleic acid, behenic acid or montanic acid.

27. The composition of claim 23 wherein the organic metal salt is calcium stearate, barium stearate or magnesium stearate.

28. The composition of claim 23 wherein the organophosphorous compound is 1-hydroxyethylidene-1,1-diphosphonic acid and the organic metal salt is calcium stearate.

29. The composition of claim 18 further comprising a weak organic base.

30. The composition of claim 29 wherein the weak organic base comprises a fatty acid amide.

31. The composition of claim 29 wherein the weak organic base is ethylene bistearamide.

32. A composition useful for nucleating thermoplastic polyesters, comprising an organophosphorous compound having at least two phosphonic acid moieties, wherein the composition is made by the process of:
suspending said compound in a nucleating agent solvent, removing the solvent, and
producing particulate solids having particle sizes fewer than about 710 microns in diameter.

33. The composition of claim 32 wherein the organophosphorous compound is selected from compounds having the formula:

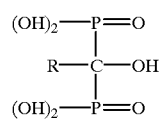

where R is hydroxy, hydrogen, or C1–C25 alkyl groups optionally having one or more substituent groups selected from —OH, —CO2H, —Cl, —Br, —NH2, —N(alkyl)H or N(alkyl)2, cycloalkyl, aryl or arylalkyl groups.

34. The composition of claim 32 wherein the organophosphorous compound is 1-hydroxyethylidene-1,1-diphosphonic acid, 1-hydroxypropylidene-1,1-diphosphonic acid, 1-hydroxybutylidene-1,1-phosphonic acid, or 1-hydroxycyclohexylidene-1,1-diphosphonic acid.

35. The composition of claim 32 wherein the nucleating agent solvent is an aliphatic alcohol.

36. The composition of claim 32 wherein the nucleating agent solvent is methanol, ethanol, 1-propanol, or 2-propanol.

37. The composition of claim 32 further comprising an organic metal salt, an inorganic metal oxide, an inorganic metal hydroxide, or an inorganic metal carbonate.

38. The composition of claim 37 wherein the organic metal salt comprises a fatty acid salt of a metal from Group I to V of the Periodic Table.

39. The composition of claim 38 wherein the metal is aluminum, antimony, tin, sodium, calcium, magnesium, barium or zinc.

40. The composition of claim 38 wherein the fatty acid is stearic acid, palmitic acid, acetic acid, propionic acid, caproic acid, oleic acid, behenic acid or montanic acid.

41. The composition of claim 38 wherein the organic metal salt is calcium stearate, barium stearate or magnesium stearate.

42. The composition of claim 32 further comprising a weak organic base.

43. The composition of claim 29 wherein the weak organic base comprises a fatty acid amide.

44. The composition of claim 29 wherein the weak organic base is ethylene bistearamide.

45. The composition of claim 32 wherein the polyester is an aliphatic polyester.

46. The composition of claim 45 wherein the aliphatic polyester is a polyhydroxyalkanoate.

47. The composition of claim 46 wherein the polyhydroxyalkanoate has the formula:

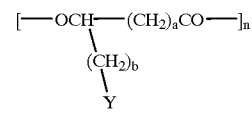

where a=1–6, b=0–15, Y is H, and n is an integer.

48. The composition of claim 47 wherein a is 1, b is 1 or 2, Y is H, and n is an integer.

49. A composition of matter comprising:
(a) one or more thermoplastic polyesters;
(b) an organophosphorous compound having at least two phosphonic acid moieties; and
(c) an organic metal salt, an inorganic metal oxide, an inorganic metal hydroxides or an inorganic metal carbonate.

50. The composition of claim 49 wherein the organophosphorous compound is selected from compounds having the formula:

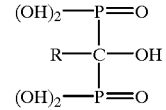

where R is hydroxy, hydrogen, or C1–C25 alkyl groups optionally having one or more substituent groups selected from —OH, —CO2H, —Cl, —Br, —NH2, —N(alkyl)H or N(alkyl)2, cycloalkyl, aryl or arylalkyl groups.

51. The composition of claim 49 wherein the organophosphorous compound is 1-hydroxyethylidene-1,1-diphosphonic acid, 1-hydroxypropylidene-1,1-diphosphonic acid, 1-hydroxybutylidene-1,1-phosphonic acid, or 1-hydroxycyclohexylidene-1,1-diphosphonic acid.

52. The composition of claim 49 wherein the polyester is an aliphatic polyester.

53. The composition of claim 49 wherein the polyester is a polyhydroxyalkanoate.

54. The composition of claim 53 wherein the polyhydroxyalkanoate has the formula:

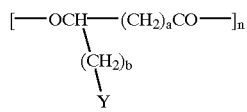

where a=1–6, b=0–15, Y is H, and n is an integer.

55. The composition of claim 54 wherein a is 1, b is 1 or 2, Y is H, and n is an integer.

56. The composition of claim 49 further comprising an organic metal salt.

57. The composition of claim 56 wherein the organic metal salt comprises a fatty acid salt of a metal from Group I to V of the Periodic Table.

58. The composition of claim 57 wherein the metal is aluminum, antimony, tin, sodium, calcium, magnesium, barium or zinc.

59. The composition of claim 57 wherein the fatty acid is stearic acid, palmitic acid, acetic acid, propionic acid, caproic acid, oleic acid, behenic acid or montanic acid.

60. The composition of claim 57 wherein the organic metal salt is calcium stearate, barium stearate or magnesium stearate.

61. The composition of claim 49 further comprising a weak organic base.

62. The composition of claim 61 wherein the weak organic base comprises a fatty acid amide.

63. The composition of claim 61 wherein the weak organic base is ethylene bistearamide.

64. A composition of matter comprising:
(a) an aliphatic polyester; and
(b) an organophosphorous compound having at least two phosphonic acid moieties.

65. The composition of claim 64 wherein the organophosphorus compound is selected from compounds having the formula:

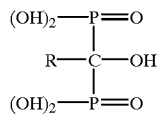

where R is hydroxy, or C1–C25 alkyl groups optionally having one or more substituent groups selected from —OH, —CO2H, —Cl, —Br, —NH2, —N(alkyl)H or N(alkyl)2, cycloalkyl, aryl or arylalkyl groups.

66. The composition of claim 64 wherein the organophosphorous compound is 1-hydroxyethylidene-1,1-diphosphonic acid, 1-hydroxypropylidene-1,1-diphosphonic acid, 1-hydroxybutylidene-1,1-phosphonic acid, or 1-hydroxycyclohexylidene-1,1-diphosphonic acid.

67. The composition of claim 64 further comprising an organic metal salt, an inorganic metal oxide, an inorganic metal hydroxide, or an inorganic metal carbonate.

68. The composition of claim 67 wherein the organic metal salt comprises a fatty acid salt of a metal from Group I to V of the Periodic Table.

69. The composition of claim 68 wherein the metal is aluminum, antimony, tin, sodium, calcium, magnesium, barium or zinc.

70. The composition of claim 68 wherein the fatty acid is stearic acid, palmitic acid, acetic acid, propionic acid, caproic acid, oleic acid, behenic acid or montanic acid.

71. The composition of claim 68 wherein the organic metal salt is calcium stearate, barium stearate or magnesium stearate.

72. The composition of claim 67 wherein the organophosphorous compound is 1-hydroxyethylidene-1,1-diphosphonic acid and the organic metal salt is calcium stearate.

73. The composition of claim 64 further comprising a weak organic base.

74. The composition of claim 73 wherein the weak organic base comprises a fatty acid amide.

75. The composition of claim 73 wherein the weak organic base is ethylene bistearamide.

76. The composition of claim 64 wherein the aliphatic polyester is a polyhydroxyalkanoate.

77. The composition of claim 76 wherein the polyhydroxyalkanoate has the formula:

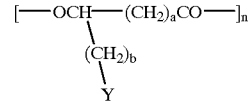

where a=1–6, b=0–15, Y is H, and n is an integer.

78. The composition of claim 77 wherein a is 1, b is 1 or 2, Y is H, and n is an integer.

79. The composition of claim 64 further comprising a nucleating agent solvent selected from aliphatic alcohols.

80. The composition of claim 64 wherein the nucleating agent solvent is methanol, ethanol, 1-propanol, or 2-propanol.

81. A method of making a nucleant for thermoplastic polyesters, which method comprises:
combining a nucleating agent solvent with an organophosphorous compound having at least two phosphonic acid moieties.

82. The method of claim 81 wherein the organophosphorous compound is selected from compounds having the formula:

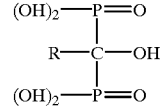

where R is hydroxy, hydrogen, or $C_1$–$C_{25}$ alkyl groups optionally having one or more substituent groups selected from —OH, —CO$_2$H, —Cl, —Br, —NH$_2$, —N(alkyl)H or N(alkyl)$_2$, cycloalkyl, aryl or arylalkyl groups.

83. The method of claim 81 wherein the organophosphorous compound is 1-hydroxyethylidene-1,1-diphosphonic acid, 1-hydroxypropylidene-1,1-diphosphonic acid, 1-hydroxybutylidene-1,1-phosphonic acid, 1-hydroxycyclohexylidene-1,1-diphosphonic acid.

84. The method of claim 81 wherein the nucleating agent solvent is an aliphatic alcohol.

85. The method of claim 81 wherein the nucleating agent solvent is methanol, ethanol, 1-propanol, or 2-propanol.

86. The method of claim 81 in which an organic metal salt or an inorganic metal oxide, metal hydroxide or metal carbonate is further combined with the nucleant and the nucleating agent solvent.

87. The method of claim 86 wherein the organic metal salt comprises a fatty acid salt of a metal from Group I to V of the Periodic Table.

88. The method of claim 87 wherein the metal is aluminum, antimony, tin, sodium, calcium, magnesium, barium or zinc.

89. The method of claim 87 wherein the fatty acid is stearic acid, palmitic acid, acetic acid, propionic acid, caproic acid, oleic acid, behenic acid or montanic acid.

90. The method of claim 87 wherein the organic metal salt is calcium stearate, barium stearate or magnesium stearate.

91. The method of claim 81 wherein a weak organic base is further combined with the nucleant and the nucleating agent solvent.

92. The method of claim 91 wherein the weak organic base comprises a fatty acid amide.

93. The method of claim 91 wherein the weak organic base is ethylene bistearamide.

94. The method of claim 81 further comprising removing the nucleating agent solvent to produce a dried solid.

95. The method of claim 94 wherein the solvent is removed by evaporation under vacuum.

96. The method of claim 94 wherein the solid is ground, pulverized, or otherwise treated so as to produce particles having diameters less than about 710 microns.

97. The method of claim 96 wherein the particles have diameters in the range of about 150 to about 350 microns.

98. A nucleant made by the method of any one of claims 81 to 97.

99. A method of making a thermoplastic polyester composition which method comprises blending said polyester with a nucleant composition of any one of claims 1–17, 18–31 or 32–49.

100. The method of claim 99 wherein the blend is melt processed into pellets.

101. The method of claim 99 wherein the polyester is an aliphatic polyester.

102. The method of claim 99 wherein the polyester is a polyhydroxyalkanoate.

103. The method of claim 102 wherein the polyhydroxyalkanoate has the formula:

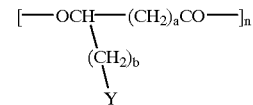

where a=1–6, b=0–15, Y is H, and n is an integer.

104. The method of claim 103 wherein a is 1, b is 1 or 2, Y is H, and n is an integer.

105. A PHA composition produced according to any one of claims 99 to 104.

106. A method of using the pellets of claim 100 to produce a film, coating or molded article.

* * * * *